Patented Apr. 18, 1950

2,504,857

UNITED STATES PATENT OFFICE 2,504,857

ART OF IMPARTING CREASE RESISTANCE TO COTTON FABRICS

William Ralph MacIntyre, Wilmington, Del., assignor to Joseph Bancroft & Sons Co., Wilmington, Del., a corporation of Delaware No Drawing. Application May 4, 1949, Serial No. 91,407

8 Claims. (Cl. 117—139.4)

This invention relates to the imparting of durable crease resistance to cotton fabrics, and the nature, objects and advantages of the invention will be best understood from the following:

It has long been known to impart crease resistance to fabrics by subjecting them to an aqueous solution of a resin or resins in the water soluble or A stage, and thereafter polymerizing the resin in and on the fabric by heat to the water insoluble stage. In place of the partially polymerized or A stage resins, a solution of the materials which react to form the resin, may be employed. Urea formaldehyde, ketone formaldehyde, melamine formaldehyde and like resins have been employed for the purpose.

The amount or degree of crease resistance will vary generally as the amount of resin applied to the fabric varies, i. e., as the amount of solids applied varies. The difficulty encountered has been that cotton fabrics suffer a substantial loss in both tensile and tear strength, particularly the latter, which is the greater of the two. The greater the crease resistance desired and therefore the higher the concentration of resin employed, the greater is the loss in strength and particularly in tear strength. With low concentrations and therefore low crease resistance, the loss in strength may be tolerated.

Heretofore, insofar as I am aware, it has been impossible to obtain either substantial or great crease resistance by conventional procedure without an objectionable loss in strength.

The primary object of the present invention is to overcome the foregoing difficulty and to obtain the desired degree of crease resistance and other effects with much less loss in strength than heretofore.

The invention is applicable to a variety of cotton fabrics and is particularly useful on certain fabrics such as seersucker where the desired crease resistance has heretofore been obtained only with a great loss in strength, particularly tear strength.

It is well known that melamine condenses with formaldehyde in acid or alkaline solutions. In this way melamine resins having various numbers of methylol groups may be formed, the maximum of such methylol groups being six in a given resin. The methylol melamines may also be methylated by condensation with methyl alcohol in acid solution, thereby forming methylated methylol melamines. I have discovered that if I use a mixture of methylated and unmethylated methylol melamines and copolymerize them in situ on the fabric, I secure certain surprising results referred to more fully hereinafter, this being especially true when using certain of the methylol melamines and methylated methylol melamines in admixture, as will further appear.

Thus, for the same amount of solids ordinarily required to obtain a given crease resistance, I can obtain greater crease resistance with less loss in strength. Or, conversely, I can obtain a given amount of crease resistance with substantially less solids than ordinarily required and therefore with relatively greatly improved strength, particularly tear strength. If, for a given amount or degree of crease resistance, one were to use a methylol melamine alone, instead of the aforesaid mixture, a greater amount of the methylol melamine on the solids basis would be required; and the same is true, if a methylated methylol melamine were used alone instead of the mixture. In other words, the copolymerization of the mixture seems to have a synergistic effect and less quantity, on the solids basis, of the mixture is required to obtain a given degree of crease resistance and, as has been pointed out, the smaller the amount of solids applied the less is the loss in strength.

In carrying out the invention I employ a ratio of the two resin constituents of from substantially 80% to 20% to substantially 20% to 80%, the one to the other. The particular ratio to use will vary in accordance with the particular fabric being treated, the resins selected and the results desired. For many purposes I find that a 50–50 mixture seems to give the greatest tear and tensile strength for the desired degree of crease resistance. At ratios substantially beyond the 80–20 to 20–80 range above referred to, the improvement of the invention is ordinarily not obtainable to any significant degree. For most purposes the usable range lies from about 70–30 to 30–70 per cent.

Depending upon the degree of crease resistance desired, the amount of resin-forming solids deposited on the fabric by weight will vary. A range of from substantially 3% to substantially 20% by weight of the fabric will cover practically all commercial requirements.

The concentration of the aqueous solution applied to the fabric is itself not critical as a dilute solution may be applied a number of times with intervening dryings. Where the solution is applied but once, with a 100% solution pick-up by weight of the fabric in the dry state, a concentration ranging from substantially 3% to 20% by weight of the resin-forming solids will ordinarily suffice.

The particular resins and combination thereof to be used will depend somewhat on the type of finish desired, the nature of the cloth being treated, etc. It is also pointed out that since copolymerization of the resins on the fabric is contemplated, it is preferred to select melamine resins which will relatively easily polymerize. Other characteristics of the resins will also influence the selection, for instance the solubility thereof prior to polymerization.

With the foregoing and various other considerations in mind, for the methylol melamine, it is contemplated that the dimethylol or the trimethylol or the tetramethylol melamine may be utilized. For the methylated methylol melamine, it is contemplated that the resin preferably be selected from the class consisting of those having at least one unmethylated methylol group and having a minimum of three methylol groups a minimum of two of which are methylated. By virtue of the presence of at least one unmethylated methylol group, the polymerization is facilitated.

It may be mentioned that certain of the resin constituents may in part be formed or altered in situ on the fabric. For instance, in the case of methylated methylol melamines having all methylol groups methylated, under the acid condition of curing some of the methyl groups may split off and thus assure the presence of at least one unmethylated methylol group and thereby facilitate polymerization.

In any event, certain mixtures of methylated methylol melamine resins may be used in combination with methylol melamines, even where the mixture contains at least some methylated methylol melamine having all methylol groups methylated. Thus, I have found that I may employ methylol melamines in admixture with a mixture of methylated methylol melamines having an average of 5.5 methylol groups, although in this instance it is preferred that not more than an average of 4.5 of the methylol groups should be methylated, such a mixture being illustrated in certain examples given below.

The combination of dimethylol melamine and dimethyl trimethylol melamine not only has good water solubility but further yields good results, as is shown in various examples hereinafter.

After the fabric has been impregnated in any conventional manner with the solution and squeezed or extracted to remove excess and to secure the desired solution pick-up, the fabric is dried in any conventional way, say for 15 minutes, in an atmosphere of about 240° F. in the case of a loop dryer or 30 seconds up to 5 minutes at about 260° F. to 340° F. in the case of tenter frame drying. The times and temperatures vary with the type of heat, the preferences of the particular operator and like factors. Thereafter the fabric is passed through an oven operating at a temperature and with the residence time of the fabric therein such that the resin is polymerized to the water insoluble stage. Ordinarily the curing temperature will vary from about 260° F. to about 340° F. with a residence time of from 20 minutes to 1 minute. It will be understood in this connection that the lower the temperatures the longer the time and the higher the temperatures the shorter the time.

The fabric is then usually but not always necessarily washed to remove the catalyst and unreacted materials, and dried. Soap may be used after washing to neutralize any acidity developed by the catalyst.

In the case where a durable mechanical finish in addition to crease resistance is desired, then it is desirable to dry the fabric after impregnation to about 5% to 15% moisture over and above the natural moisture content, and then pass it through the finishing machine, and to cool the dried fabric by cooling cans or the like. In the case of a mechanical finish obtained on a friction calender, the setting or polymerization of the resin and the imparting of the mechanical finish may be obtained simultaneously by operating the heated bowls at sufficiently high temperature and by passing the fabric through the calender a sufficient number of times; or the polymerization may occur partially on the friction calender and completed in an oven; or the polymerization may be substantially all done in an oven after passage of the fabric through the calender. In the case of a schreiner calender or an embossing calender, where the fabric may be passed but once through the calender, subsequent oven treatment is required to polymerize the resin to the insoluble state. In the case of the plain or flat nip calender, with the rolls operating at the same speed, depending upon the number of bowls and the temperature and the number of passes through the machine, subsequent oven treatment may or may not be required. Ordinarily, with this type of calender, it is desirable to follow the imparting of the mechanical finish by an oven treatment to ensure that the resin is completely set. In the case of a chasing calender it is also ordinarily desirable to follow with oven treatment.

The mechanical finish may be imparted first and the fabric afterwards impregnated and cured, in which case the luster of the mechanical finish will be less.

Of course, an acid catalyst is embodied in the impregnating solution in minor amounts, and although there are many known catalysts for catalyzing the reaction between the resin forming ingredients which are usable, I prefer to employ that type of catalyst which has little or no substantial acidity at normal temperatures but which develops acidity at elevated temperatures, such as those which occur during the curing. These are particularly useful in cases where a mechanical finish is desired in addition to crease resistance. For the preferred catalysts we mention phenyl biguanide hydrochloride, diammonium phosphate, and ammonium thiocyanate. Other usable catalysts which may be mentioned are zinc chloride, magnesium chloride, other acid salts, or diluted acids such as acetic or hydrochloric, and still other catalysts such as mentioned in examples given hereinafter.

Any of the softeners known to the textile art may also be incorporated in the solution, and in the case of a mechanical finish on the friction calender it is desirable to add a textile lubricant of which there are a multitude, in order to facilitate passage through the friction calendar without chewing of the fabric. Various softeners are included in the examples given herebelow.

The fabric may be impregnated with the solution in any conventional manner as by dipping, padding, and the like.

Since there is a possibility of the release of some formaldehyde during the copolymerization of the melamine resins, it is sometimes desirable to add some urea or similar organic nitrogen containing weak base, such as biuret, acetamide and dicyandiamide, to the solution. The urea will react with any formaldehyde so released and thus buffer the action of the formaldehyde with the cellulose, and thus tend to minimize the degrading action on the cellulose of any formaldehyde released. Little urea need be added, but it may be added in substantial quantity because, being a weak base, a substantial increase in amount does not correspondingly affect the pH.

EXAMPLES

*Example I*

Pure cotton seersucker was impregnated with the following solution:

28 lbs. dimethylol melamine (100% solids)
35 lbs. dimethyl trimethylol melamine (80% solids)
40 lbs. stearamido-ethyl diethyl methyl quaternary ammonium methyl sulphate
3.0 lbs. dimonoethanol amine hydrogen phosphate
Made up with water to 800 lbs.

Squeezed so that approximately 85% of the solution was left in the cloth. Dried at 240° F. for 8 minutes on a loop type dryer. Cured for 5 minutes at 290° F. in a loop ager. Washed with ¼% sodium carbonate solution 10 minutes in a beck at 180° F. Followed by two hot water rinses and loop dried at 240° F. for 10 minutes.

*Examples II and III*

The same fabric was treated with the same solution except that in one case dimethylol melamine and in the other case dimethyl trimethylol melamine were each used alone instead of in admixture, using in each case an equal amount on the solids basis and handled in the same manner, i. e., an amount equal to the amount of resin solids used when employing an admixture of the two.

The fabric treated with the admixture has increased crease resistance and retains 26% more tear strength and 37% more tensile strength than the methylated resin alone, and 12½% more tear strength and 14% more tensile strength than the unmethylated resin alone, notwithstanding that the same amount of resin solids were present on the fabric.

*Example IV*

30 lbs. dimethyl trimethylol melamine (80% solids)
48 lbs. trimethylol melamine (100% solids)
40 lbs. trimethyl ammonium methyl sulphate of monostearylmetaphenylenediamine
3.0 lbs. phenyl biguanide hydrochloride
Made up to 100 gallons with water A pure singed bleached cotton fabric is padded in the above solution on a mangle with enough pressure so that the "pick-up" of the cloth is 90%, i. e., the cloth after padding shows an increase of 90% over the dry weight of the cloth before padding, frame dried on a tenter frame at 260° F., cured 3 minutes at 300° F., washed well in hot water, and finally dried.

The fabric has increased crease resistance and retains 4% more tensile strength in the warp and 25% more tensile strength in the filling and 20% more tear strength than the same fabric treated with the same solution, except that trimethylol melamine was used alone instead of in admixture in the same amount on the solids basis.

The fabric has increased crease resistance and retains 131% more tensile strength in the warp and 22% more tensile strength in the filling and 14% more tear strength than the same fabric treated with the same solution except that dimethyl trimethylol melamine was used alone instead of in admixture in the same amount on the solids basis.

*Example V*

A pure cotton 48 x 48 fabric was impregnated with the following solution:

60 lbs. dimethyl trimethylol melamine (80% solids)
24 lbs. trimethylol melamine (100% solids)
40 lbs. trimethyl ammonium methyl sulphate of monostearylmetaphenylenediamine
3.0 lbs. carbazide hydrochloride
Made up with water to 800 lbs. and processed as in Example IV.

This fabric as compared with the same fabric treated with the same solution, except that trimethylol melamine was used alone instead of in admixture, in the same amount on the solids basis, has increased crease resistance and retains 12.5% more tear strength in the warp yarns and 46% in the filling yarns and 18% more tensile strength in the warp and 33% more tensile strength in the filling. When compared with the same fabric treated with an equal amount on the solids basis of the diethyl trimethylol melamine, the crease resistance has increased and the fabric retains 2% more tear strength in the warp yarn and 10.9% more tear strength in the filling and 11.5% more tensile strength in the warp and 4.4% more tensile strength in the filling.

*Example VI*

57 lbs. dimethylol melamine (100% solids)
18 lbs. dimethyl trimethylol melamine (80% solids)
40 lbs. trimethyl ammonium methyl sulphate of monostearylmetaphenylenediamine
10 lbs. diammonium phosphate
Made up to 100 gallons with water A cotton fabric was impregnated with the above prepared solution, squeezed, partially dried so that it retained about 10% moisture, glazed by passing through a heated (350° F.) friction calender twice, and then baked 5 minutes at 300° F., followed by washing and drying.

The fabric has increased crease resistance and retains 28% more tensile strength in the warp and 22% more tensile strength in the filling direction and 25% more tear strength than the same fabric treated with the same solution in the same manner except that dimethylol melamine in the same amount on the solids basis was used alone instead of in admixture.

The fabric has increased crease resistance and retains 72% more tensile strength in the warp and 41% more tensile strength in the filling and 17% more tear strength than the same fabric treated with the same solution except that dimethyl trimethylol melamine was used alone instead of in admixture in the same amount on the solids basis.

The luster on the fabric is fast to washing.

*Example VII*

36 lbs. dimethylol melamine (100% solids)
45 lbs. dimethyl trimethylol melamine (80% solids)
30 lbs. octadecyl pyridinium bromide
10 lbs. ammonium thiocyanate
20 lbs. acetamide
Water to make up to 100 gallons A cotton fabric was impregnated with the above solution, squeezed, partially dried so that it still retained 10% moisture, run once through a hot (350° F.) flat nip calender (both bowls running at the same speed), and then baked 8 minutes at 280° F. followed by washing and drying.

This fabric has increased crease resistance and retains 91% more tensile strength and 52% more tear strength than the same fabric treated with the same solution except that dimethylol melamine was used alone instead of in admixture in the same amount on the solids basis.

This fabric has increased crease resistance and retains 37% more tensile strength and 40% more tear strength than the same fabric treated with the same solution except that dimethyl trimethylol melamine was used alone instead of in admixture in the same amount on the solids basis.

The luster is fast to washing.

Example VIII 72 lbs. dimethyl trimethylol melamine (80% solids)
14 lbs. dimethylol melamine (100% solids)
20 lbs. urea
10 lbs. ammonium thiocyanate
Water added to make 100 gallons A cotton seersucker fabric was impregnated with the above solution, dried, cured, washed, and dried as described in Example I.

This fabric as compared with the same fabric treated with the same solution, except that dimethylol melamine was used alone instead of in admixture in the same amount on the solids basis, has increased crease resistance and retains 30% more tear strength and 22% more tensile strength.

When compared with the same fabric treated with an equal amount on the solids basis of the dimethyl trimethylol melamine, the fabric of this example showed the following: 18% more tear strength and 26% more tensile strength and has increased crease resistance.

Example IX

A cotton seersucker fabric was impregnated with the following solution:

17½ lbs. dimethyl trimethylol melamine (80% solids)
14 lbs. dimethylol melamine (100% solids)
40 lbs. trimethylammonium methyl sulphate of monostearylmetaphenylenediamine
1.5 lbs. carbazide hydrochloride
Made up to 100 gallons with water
Handled as in Examples I, II, and III The tear strength was 13.7% more than the dimethyl trimethylol melamine treated fabric and 36.7% more than the dimethylol melamine treated fabric.

Tensile warp 6% more than the methylated and unmethylated treated fabrics. Filling 4.3% more than methylated and 45% more than unmethylated treated fabrics.

The fabric has increased crease resistance.

Example X

A cotton fabric was sized in the following solution, dried, cured, washed, and dried as described in Example IV.

80 lbs. dimethylol melamine (100% solids)
100 lbs. dimethyltrimethylol melamine (80% solids)
40 lbs. trimethyl ammonium methyl sulphate of monostearylmetaphenylenediamine
3.0 lbs. ammonium bisulphate acetone
Water to make up to 100 gallons The same fabric was treated with the same solution except that the dimethylol melamine and dimethyl trimethylol melamine were used alone instead of in admixture using the same amount on the solids basis and handled in the same manner.

The fabric treated with the admixture has increased crease resistance and retains 43% more tear strength and 27% more tensile strength than the methylated resin alone and 56% more tear strength and 33% more tensile strength than the unmethylated resin alone.

Example XI

Repetition of Example I, except that the curing temperature was 260° F. and the time 20 minutes.

Example XII

Repetition of Example I except that the curing temperature was 340° F. and the time 1 minute.

Example XIII

A cotton fabric was sized in the following solution:

25 lbs. sulfonated tallow
In 100 gallons of water

Squeezed, partially dried so that it still retained 10% moisture, glazed by passing through a heated (350° F.) friction calender three times.

The cloth was then padded with the solution used in Example IV, and was dried, etc., as in Example IV.

The fabric has increased crease resistance and retains 8% more tensile strength in the warp and 23% more tensile strength in the filling and 26% more tear strength than the same fabric treated with the same solution except that dimethylol melamine was used alone instead of in admixture in the same amount on the solids basis.

The fabric has increased crease resistance and retains 96% more tensile strength in the warp and 36% more tensile strength in the filling and 21% more tear strength than the same fabric treated with the same solution except that dimethyl trimethylol melamine was used alone instead of in admixture in the same amount on the solids basis.

Example XIV 18 lbs. tetramethyl pentamethylol melamine (80% solids)
48 lbs. tetramethylol melamine (100% solids)
40 lbs. trimethyl ammonium methyl sulphate of monostearylmetaphenylenediamine
2.5 lbs. phenyl biguanide hydrochloride
Water to make up to 100 gallons A cotton fabric was impregnated with the above solution, dried, baked 5 minutes at 300° F., followed by washing, and drying.

This fabric has increased crease resistance and retains 18% more tensile strength in the warp and 15% more tensile strength in the filling and retains 23% more tear strength in the warp and 6% more tear strength in the filling than the same fabric treated with the same solution except that tetramethylol melamine was used alone instead of in admixture in the same amounts on the solids basis.

The fabric has increased crease resistance and retains 13% more tensile strength in the warp and 17% more tensile strength in the filling, and retains 28% more tear strength in the warp and 12% more tear strength in the filling than the same fabric treated with the same solution except that tetramethyl pentamethylol melamine was used alone instead of in admixture in the same amounts on the solids basis.

Example XV 24 lbs. of 80% solution of a mixture of tetramethyl pentamethylol melamine, tetramethyl hexamethylol melamine, pentamethyl pentamethylol melamine and pentamethyl hexamethylol melamine (having an average of 5.5 methylol groups and an average of 4.5 methyl groups)
4.6 lbs. tetramethylol melamine (100% solids)
40 lbs. s-Di [1-(2-palmitamidoethyl)] urea monoacetate
2.5 lbs. phenyl biguanide hydrochloride
Water to make 100 gallons A pure cotton fabric was impregnated and processed as in Example XIV.

This fabric has increased crease resistance and retains 21.5% more tear strength in the warp and 10% more tear strength in the filling than the same fabric treated with the same solution except that tetramethyl pentamethylol melamine was used alone instead of in admixture in the same amounts on the solids basis.

The fabric has increased crease resistance and retains 11% more tear strength in the warp and 4.5% more tear strength in the filling than the same fabric treated with the same solution except that tetramethylol melamine was used alone instead of in admixture in the same amounts on the solids basis.

Example XVI 6 lbs. of 80% solution of a mixture of tetramethyl pentamethylol melamine, tetramethyl hexamethylol melamine, pentamethyl pentamethylol melamine and pentamethyl hexamethylol melamine (having an average of 5.5 methylol groups and an average of 4.5 methyl groups)
16 lbs. tetramethylol melamine (100% solids)
40 lbs. trimethyl ammonium methyl sulphate of monostearylmetaphenylenediamine
2.0 lbs. phenyl biguanide hydrochloride
Water to make up to 100 gallons A cotton fabric was impregnated with the above solution, squeezed, partially dried so that it still retained 10% moisture, run through a hot (350° F.) flat nip calender, and then baked 5 minutes at 300° F., followed by washing and drying.

This fabric has increased crease resistance and retains 10% more tensile strength in the warp and 12½% more tensile strength in the filling than the same fabric treated with the same solution except that tetramethylol melamine was used alone instead of in admixture in the same amounts on the solids basis.

The fabric has increased crease resistance and retains 4% more tensile strength in the warp and 10% more tensile strength in the filling than the same fabric treated with the same solution except tetramethyl pentamethylol melamine was used alone instead of in admixture in the same amounts on the solids basis.

The finishes of all examples were durable to washing and the like.

The melamine resins used in the examples given above are further identified in the table just below by maker and trade name.

| Resin | Trade Name | Maker |
|---|---|---|
| Dimethylol Melamine | Resloom HP | Monsanto Chemical Co. |
| Dimethyl Trimethylol Melamine | Aerotex M-3 | Calco Chemical Division; American Cyanamid Company. |
| Trimethylol Melamine | Aerotex 605 | Do. |
| Tetramethylol Melamine | Resloom HP Spec. | Monsanto Chemical Co. |
| Tetramethyl Pentamethylol Melamine | Resloom LC-48 | Do. |
| Mixture referred to in Examples XV and XVI | Aerotex M-6 | Calco Chemical Division; American Cyanamid Company. |

I claim:

1. In the imparting of crease resistance to cotton fabrics, the process which consists in impregnating the fabric with an aqueous solution of a mixture of a methylol melamine and a methylated methylol melamine with a ratio ranging from 80% to 20% to 20% to 80% of one resin to the other on the solids basis by weight, said methylol melamine being selected from the class consisting of di-, tri-, and tetramethylol melamines, and said methylated methylol melamine being selected from the class consisting of those having at least one unmethylated methylol group and having a minimum of three methylol groups a minimum of two of which are methylated, the amount of resin solids applied to the fabric being equal to that applied with a single application of solution with 100% solution pick-up by weight on the fabric in the dry state where the solution contains from 3% to 20% resin solids by weight of the solution, drying the fabric and heating to polymerize the resins to the water insoluble state.

2. The process of claim 1 in which the ratio of one resin to the other is 50–50.

3. The process of claim 1 in which the ratio of said methylol melamine to methylated methylol melamine is 70% to 30%.

4. In the imparting of crease resistance to cotton fabrics, the process which consists in impregnating the fabric with an aqueous solution of a mixture of dimethylol melamine and dimethyl trimethylol melamine with a ratio ranging from 80% to 20% to 20% to 80% of one resin to the other on the solids basis by weight, the amount of resin solids applied to the fabric being equal to that applied with a single application of solution with 100% solution pick-up by weight on the fabric in the dry state where the solution contains from 3% to 20% resin solids by weight of the solution, drying the fabric, and heating to polymerize the resins to the water insoluble state.

5. In the imparting of crease resistance to cotton fabrics, the process which consists in impregnating the fabric with an aqueous solution of a mixture of a methylol melamine and a methylated methylol melamine with a ratio ranging from 80% to 20% to 20% to 80% of one resin to the other on the solids basis by weight, said methylol melamine being selected from the class consisting of di-, tri-, and tetramethylol melamines, the amount of resin solids applied to the fabric being equal to that applied with a single application of solution with 100% solution pick-up by weight on the fabric in the dry state where the solution contains from 3% to 20% resin solids by weight of the solution, drying the fabric and heating under acidic curing conditions to polymerize the resins to the water insoluble state.

6. A crease resistant cotton fabric embodying the water insoluble copolymer of a methylol melamine and a methylated methylol melamine in the relative ratio of from 80% to 20% to 20% to 80% of one resin to the other, said methylol melamine being selected from the class consisting of di-, tri-, and tetramethylol melamines, and said methylated methylol melamine being selected from the class consisting of those having at least one unmethylated methylol group and having a minimum of three methylol groups, a minimum of two of which groups are methylated.

7. A crease resistant cotton fabric according to claim 6 in which said methylol melamine is dimethylol melamine and in which said methylated methylol melamine is dimethyl trimethylol melamine.

8. In the imparting of crease resistance to cotton fabrics, the process which consists in impregnating the fabric with an aqueous solution of a mixture of a methylol melamine and a methylated methylol melamine with a ratio ranging from 80% to 20% to 20% to 80% of one resin to the other on the solids basis by weight, said methylated methylol melamine being selected from the class consisting of those having at least one unmethylated methylol group and having a minimum of three methylol groups a minimum of two of which are methylated, the amount of resin solids applied to the fabric being equal to that applied with a single application of solution with 100% solution pick-up by weight on the fabric in the dry state where the solution contains from 3% to 20% resin solids by weight of the solution, drying the fabric and heating under acidic curing conditions to polymerize the resins to the water insoluble state.

WILLIAM RALPH MacINTYRE.

REFERENCES CITED

The following references are of record in the file of this patent:

UNITED STATES PATENTS

| Number | Name | Date |
|---|---|---|
| 2,197,357 | Widmer (1) | Apr. 16, 1940 |
| 2,339,203 | Stiegler | Jan. 11, 1944 |
| 2,350,139 | Widmer (2) | May 30, 1944 |

FOREIGN PATENTS

| Number | Country | Date |
|---|---|---|
| 466,015 | Great Britain | May 10, 1937 |